United States Patent
Zhang et al.

(10) Patent No.: US 8,677,187 B2
(45) Date of Patent: Mar. 18, 2014

(54) PERFORMING NETWORK CORE DUMP WITHOUT DRIVERS

(75) Inventors: Ronghua Zhang, San Jose, CA (US); Saleem Abdulrasool, Palo Alto, CA (US); Mallik Mahalingam, Cupertino, CA (US); Boon Seong Ang, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 242 days.

(21) Appl. No.: 13/078,156

(22) Filed: Apr. 1, 2011

(65) Prior Publication Data

US 2012/0254667 A1 Oct. 4, 2012

(51) Int. Cl.
*G06F 11/00* (2006.01)
(52) U.S. Cl.
USPC .................. 714/38.1; 713/2; 714/1; 712/229
(58) Field of Classification Search
USPC ................................ 714/38.1, 1, 2, 25; 713/2
See application file for complete search history.

(56) References Cited

U.S. PATENT DOCUMENTS

| | | | |
|---|---|---|---|
| 5,784,628 A * | 7/1998 | Reneris | 713/300 |
| 2004/0003317 A1* | 1/2004 | Kwatra et al. | 714/25 |
| 2006/0143432 A1* | 6/2006 | Rothman et al. | 713/2 |
| 2007/0005950 A1* | 1/2007 | Backman | 713/2 |
| 2008/0082809 A1* | 4/2008 | Rothman et al. | 713/1 |
| 2009/0031166 A1* | 1/2009 | Kathail et al. | 714/4 |
| 2009/0037706 A1* | 2/2009 | Herrera Van Der Nood | 712/229 |
| 2009/0164849 A1* | 6/2009 | Sugaya | 714/38 |
| 2009/0307340 A1* | 12/2009 | Haneefa et al. | 709/222 |
| 2012/0246513 A9* | 9/2012 | Bum et al. | 714/19 |

OTHER PUBLICATIONS

PXELINUX documentation, downloaded from http://syslinux.zytor.com/wiki/index.php/PXELINUX on Mar. 29, 2011.
Advanced Configuration and Power Interface Specification, Rev. 4.0a, Apr. 5, 2010, pp. 477-498.

* cited by examiner

*Primary Examiner* — Sarai Butler

(57) ABSTRACT

Core dump is performed over a network without relying on network device drivers. Instead of network device drivers, firmware of network devices that is typically used during boot is preserved in memory post-boot, and one or more application program interfaces of the firmware are invoked to perform the network core dump. For ease of implementation, a network bootstrap program that has standard application program interfaces for calling into the firmware of network devices may be invoked when performing core dump over the network.

25 Claims, 4 Drawing Sheets

PERFORMING NETWORK CORE DUMP WITHOUT DRIVERS

BACKGROUND

Core dump refers to a process of saving the working memory state of a computer program, e.g., system software of a computing device such as an operating system (OS) of a conventional computing device or a hypervisor of a virtualized computing device, at a specific time, generally when the program has terminated abnormally, the abnormal termination commonly being referred to as a "crash." The working memory state of the computer program at the time of the crash is saved to a special partition on a storage device or, more generally, to any writable persistent storage device that is accessible at the time of the crash. When the computing device is stateless, i.e., no provision of a storage device, the core dump is performed over a network to a network dump server.

In order to perform a network core dump, the network device and the network stack that includes the network device driver must be functioning correctly. If the core dump is triggered by a failure in the network stack, the computing device will be unable to carry out the core dump over the network. In some cases, the network device may be locked up or have become wedged in a particular state, and cannot function properly unless it is reset and its driver reinitialized. When that happens, the core dump over the network cannot be performed easily, because it is difficult to reinitialize the network device driver when it has already been loaded into memory. In view of the aforementioned issues, the conventional network core dump process has not been very reliable.

A variation of the above approach is to use a special mini-kernel. During boot, this mini-kernel is loaded into some reserved memory region. When a crash occurs, control is transferred to the mini-kernel, which then resets the network device, initializes the network stack, and performs the core dump over the network. A limitation of this variation is again its reliance on the network device driver. If the network device driver caused the crash, the core dump over the network cannot be carried out.

Another approach for performing network core dump is to save the working memory state of the computer program in a predetermined region of memory and perform the network core dump from the predetermined region of memory after rebooting the computing device. This technique, however, relies on the memory state of this predetermined region of memory persisting across reboots, and many of today's computing devices do not provide such a capability. The use of this technique is further limited by the fact that some computing devices employ hardware memory scrubbers that clean up memory on boot.

SUMMARY

One or more embodiments of the present invention provide a technique to perform a core dump over a network without relying on network device drivers. Instead of network device drivers, firmware of network devices that is typically used during boot is preserved in memory post-boot, and one or more application program interfaces of the firmware are invoked to perform the network core dump. In one embodiment, a network bootstrap program that has standard application program interfaces for calling into the firmware of network devices is invoked.

A method of transferring diagnostic data for a computing device, such as core dump data, over a network using a network device, according to an embodiment of the present invention includes the steps of: prior to loading of system software for the computing device into memory, loading application programming interfaces (APIs) for the network device into a protected memory region, the contents of which are preserved after loading of the system software and after execution control of the computing device has been transferred to the system software; and after loading of the system software and after the execution control of the computing device has been transferred to the system software, invoking one or more APIs to transfer the diagnostic data over the network using the network device.

A computing device, according to an embodiment of the present invention, has one or more applications executed therein on top of system software for the computing device. The computing device further includes a processing unit under control of the system software that is executing instructions from the one or more applications, a network device having firmware stored therein, and a system memory having stored therein a copy of the firmware of the network device. Additionally, the system memory may have stored therein a copy of a network bootstrap program that includes application programming interfaces that call into the firmware of the network device.

Further embodiments of the present invention include, without limitation, a non-transitory computer-readable storage medium that includes instructions that enable a processing unit to implement one or more aspects of the above methods as well as a computer system configured to implement one or more aspects of the above methods.

DETAILED DESCRIPTION

Figure 1:
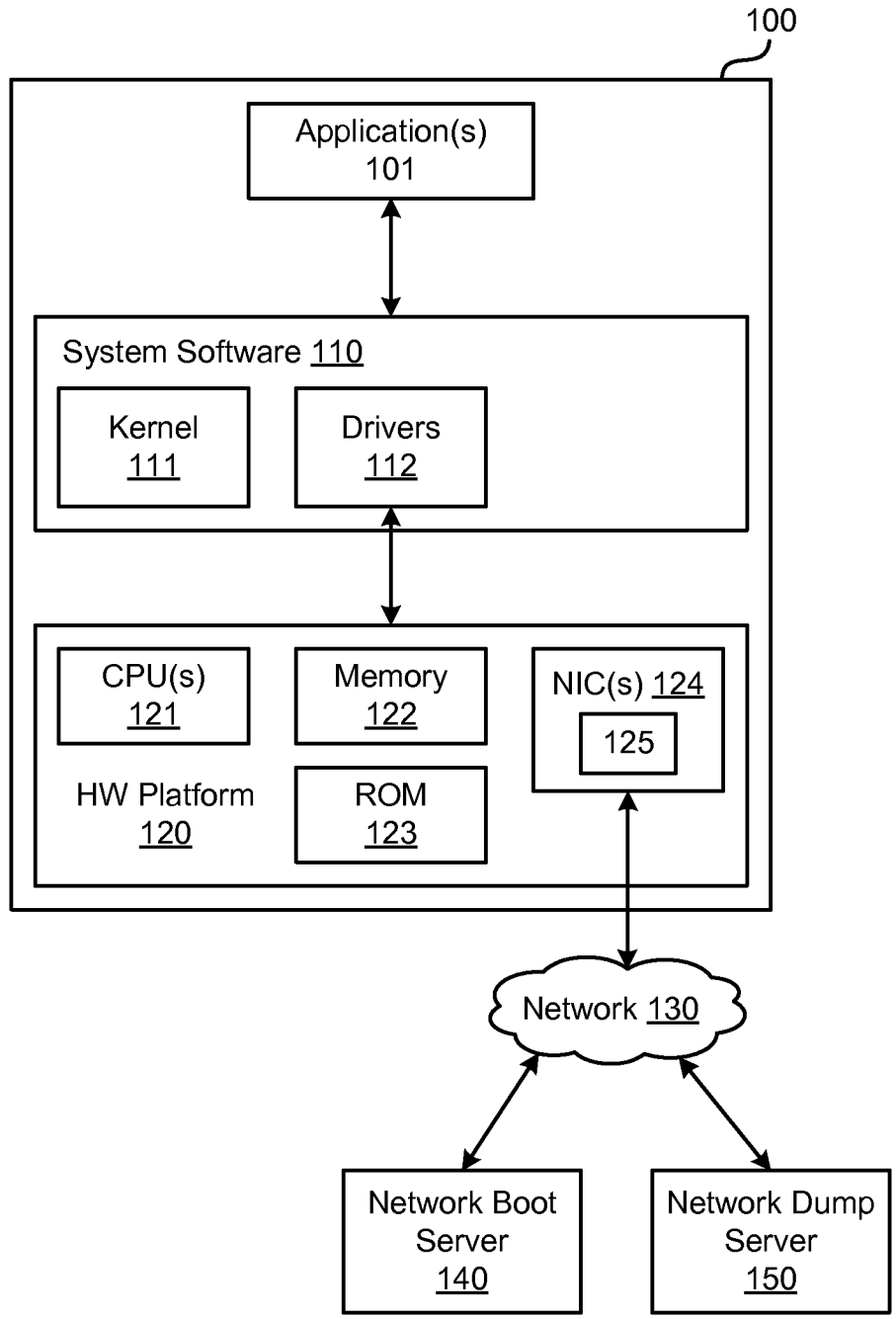
FIG. 1 is a block diagram of a computer system in which one or more embodiments of the present invention may be implemented.

FIG. 1 is a block diagram of a computer system 100 in which one or more embodiments of the present invention may be implemented. Computer system 100 includes one or more applications 101 that are running on top of system software 110. System software 110 includes a plurality of software layers including a kernel 111 that manages hardware resources provided by hardware platform 120 through various drivers 112. In one embodiment, system software 110 is an operating system (OS), such as operating systems that are commercially available. In another embodiment, system software 110 is a hypervisor that may be included as a component of VMware's vSphere® product, which is commercially available from VMware, Inc. of Palo Alto, Calif., that supports virtual machine applications running thereon. Hardware platform 120 includes one or more central processing units (CPUs) 121, system memory 122, read-only-memory (ROM) 123, and one or more network interface cards (NICs) 124 that connect computer system 100 to a network 130. Each NIC 124 includes a non-volatile memory section 125 that stores the firmware for the device. In the embodiments of the present invention described herein, the firmware for NIC 124 includes UNDI (Universal Network Device Interface) application programming interfaces (APIs). UNDI APIs provide a device-agnostic way to gain network access without the use of any drivers, and are used for network access during a network boot process prior to loading of the NIC drivers. According to one or more embodiments of the present invention, UNDI APIs are preserved in system memory 122 post-boot and are used for network access during a network core dump process.

As depicted in FIG. 1, computer system 100 is a stateless machine because it is not connected to a storage device. As a result, it is booted from the network in accordance with the basic input/output system (BIOS) settings stored in ROM 123. However, it should be recognized that the present invention is not limited to stateless computing devices and may be used with computing devices that have connected storage devices and may or may not undergo a network boot process.

Figure 2:
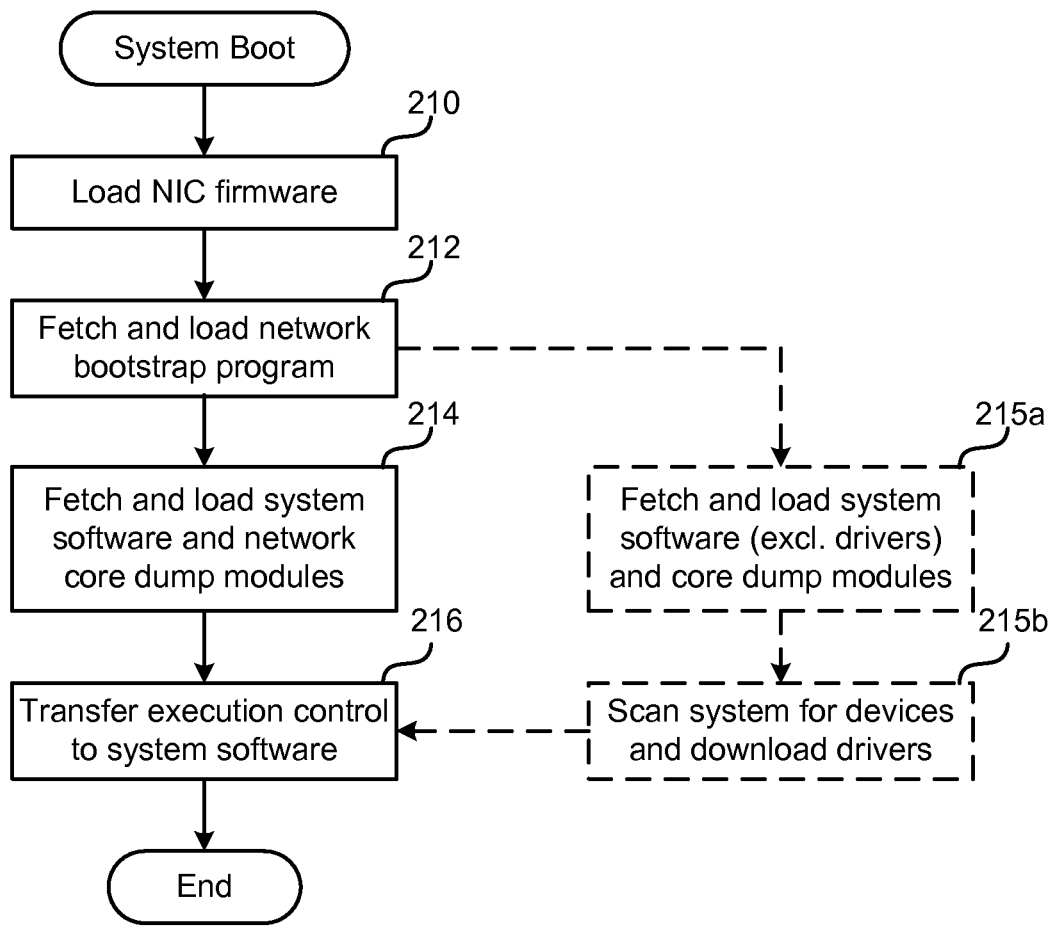
FIG. 2 is a flow diagram that illustrates the steps of a method for booting a computer system according to an embodiment of the present invention.

The network boot process according to an embodiment of the present invention is illustrated in FIG. 2. At step 210, the firmware for NIC 124, which includes UNDI APIs, is loaded into system memory 122, to allow computer system 100 to gain network access before any drivers are loaded. Once network access is made achievable through UNDI APIs, at step 212, a network bootstrap program is fetched from network boot server 140 and loaded into system memory 122. In one embodiment, the network bootstrap program known as PXELINUX is fetched. PXELINUX provides a standard set of APIs that invoke UNDI APIs for transmitting and receiving packets over the network and take care of switching CPU 121 between protected mode (32-bit addressing mode) and real mode (16-bit addressing mode). At step 214, after PXELINUX is loaded into system memory 122, APIs of PXELINUX are invoked to fetch an image of system software 110 from network boot server 140 and load it into system memory 122. System software 110 that is fetched and loaded includes a core dump handler. The core dump handler is installed as part of kernel 111 and is configured with the IP address of a network dump server 150 (FIG. 1), the MAC address of the NIC designated for the network core dump, and the IP address for the NIC to use. In addition, a device independent network interface (DINI) module (described below) that interacts with the network core dump handler during the process of carrying out the core dump process over the network is loaded into system memory 122. Booting is complete when execution control of computer system 100 is transferred to system software 110 at step 216.

Steps 215a and 215b of FIG. 2 are illustrated in dashed boxes to indicate that the network boot process, in alternative embodiments of the present invention, may employ steps 215a and 215b in place of step 214. At step 215a, system software 110 that is fetched and loaded includes the core dump handler but excludes device drivers. In addition, the DINI module is loaded into system memory 122 at step 215a. Then, at step 215b, kernel 111 of system software 110 scans computer system 100, identifies all devices, and the drivers for these devices are downloaded from a central server using the DINI module. Booting is complete when execution control of computer system 100 is transferred to system software 110 at step 216. It should be recognized that this alternative booting process simplifies device driver management because the device drivers are managed as a catalog of device drivers separately from the system software that they are associated with and deployed from a central location.

According to one or more embodiments of the present invention, after booting has completed and execution control of computer system 100 has been transferred to system software 110, regions of system memory 122 into which UNDI APIs and PXELINUX are loaded are preserved (as further described below) so that they may be used during the network core dump process. By providing access to these APIs post-boot, the network core dump process can be carried out without reliance on network device drivers. According to one embodiment of the present invention, upon abnormal termination of system software 110, a core dump process is performed over network 130 using APIs of PXELINUX which invoke UNDI APIs to transfer ("dump") the working state of memory 122 to network dump server 150 for diagnosis.

FIGS. 3A, 3B, 3C, and 3D illustrate different regions of system memory and how they are used in one or more embodiments of the present invention. System memory 122 includes a 640 KB region that is addressable in real mode and a 4 GB region that is addressable in protected mode. The entire region is addressable in long mode. As illustrated, the 640 KB region has an upper boundary 301 and the 4 GB region has an upper boundary 303.

Figure 3A:
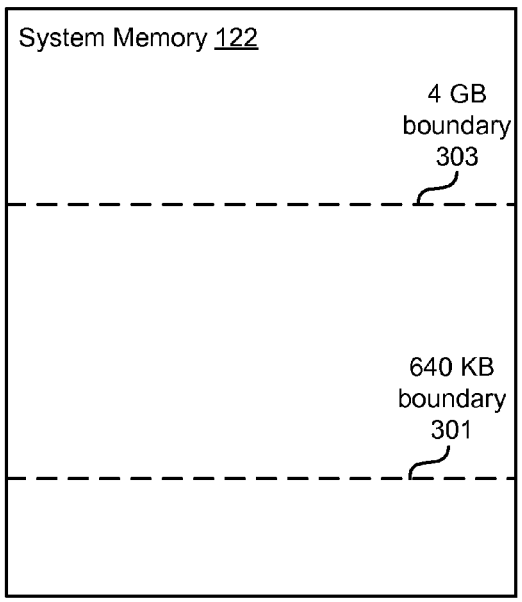
FIGS. 3A, 3B, 3C, and 3D illustrate different regions of system memory and how they are used in one or more embodiments of the present invention.
Figure 3B:
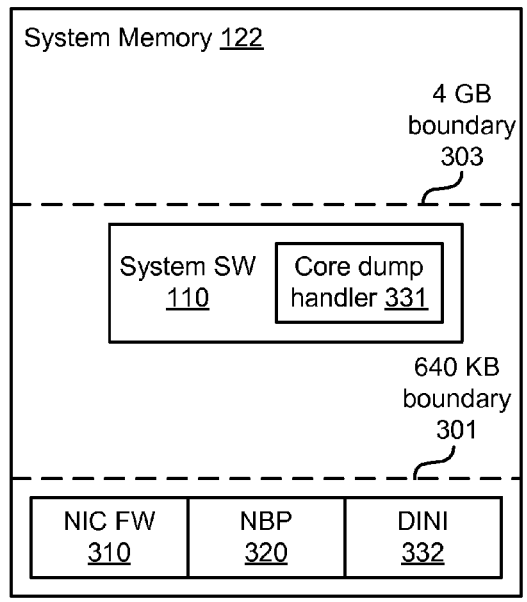

FIG. 3A illustrates the state of system memory 122 prior to boot. FIG. 3B illustrates the state of system memory 122 after system software 110 has been loaded into system memory 122. FIG. 3B illustrates data corresponding to firmware for NIC 124 (NIC FW 310), including UNDI APIs, that is loaded into system memory 122 in the 640 KB region at step 210 in FIG. 2. UNDI APIs are then used to fetch a network bootstrap program (NBP) 320, such as PXELINUX at step 212 in FIG. 2. NBP 320 is also loaded into system memory 122 in the 640 KB region. System software 110 is fetched and loaded into system memory 122 using PXELINUX at step 214 in FIG. 2. Because PXELINUX can perform the switching between real mode and protected mode, system software 110 can be loaded into the 4 GB region using PXELINUX. As further shown in FIG. 3B, included in system software 110 is a core dump handler 331, which is configured with the IP address of network dump server 150, the MAC address of the NIC to be used for core dump, and the IP address for the NIC to use. Core dump handler 331 is installed as part of kernel 111 of system software 110, and kernel 111 invokes core dump handler 331 when system software 110 abnormally terminates. DINI module 332 is installed at the same time as the core dump handler 331. DINI module 332 works with core dump handler 331 to carry out the network core dump functionality as described in conjunction with FIG. 4 below. DINI module 332 is loaded into system memory 122 in the 640 KB region.

Figure 3C:
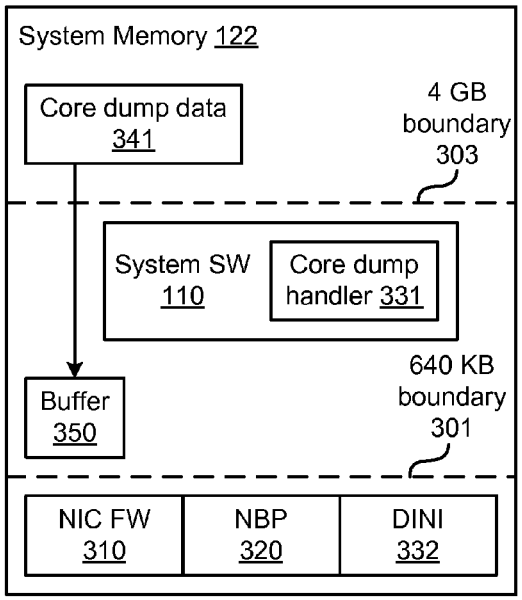
Figure 3D:
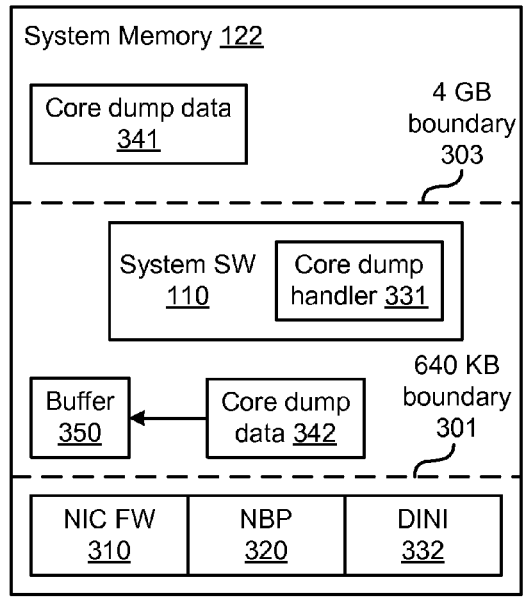

In accordance with one or more embodiments of the present invention, the region of system memory 122 containing NIC FW 310, NBP 320, and DINI module 332 is preserved post-boot, i.e., after execution control of computer system 100 has been transferred to system software 110. The preservation of the region of system memory 122 containing NIC FW 310, NBP 320, and DINI module 332 is illustrated in FIGS. 3C and 3D, which depict contents of system memory 122 post-boot. To ensure that nothing gets written into this protected memory region, the protected memory region is excluded from any physical memory mappings generated by the memory management unit of CPU 121. In addition, a valid IOMMU domain for devices is defined and the protected memory region is excluded from that domain. As a check to see if the protected memory region has been preserved, a checksum of the protected memory region is calculated right after NIC FW 310, NBP 320, and DINI module 332 have been loaded. Then, when core dump handler 331 is invoked, a checksum of the protected memory region is calculated once more. If the two checksums mismatch, core dump handler 331 aborts the network core dump process, and system software 110 may continue with another core dumping technique, such as core dumping to disks, if available.

In one or more embodiments of the present invention that employ system software that is configured for multiboot, a multiboot data structure, generally known as "multiboot info," is modified to indicate that the protected memory region is reserved so that system software 110 does not attempt to use them. In addition, for system software that runs on x86 architecture, a memory map known as E820 may be modified to report to system software 110 that the protected memory region are reserved and not usable by system software 110. The E820 memory map is described in additional detail in *Advanced Configuration and Power Interface Specification*, Rev. 4.0a, Apr. 5, 2010, pp. 477-98, the entire contents of which are incorporated by reference herein.

FIG. 3C illustrates the memory regions of system memory 122 when the memory being dumped, depicted as data 341, lies in a region of system memory 122 that is above the 4 GB boundary. In this situation, portions of data 341 are copied into a buffer 350 provided within the 4 GB memory region. After such copying, core dump handler 331 assembles the buffered data into a network packet, including the IP address of network dump server 150, the MAC address of NIC 124 that is to be used, and the IP address for the NIC in the header of the network packet. After assembly of the network packet by core dump handler 331, DINI module 332 takes over control and invokes PXELINUX to transmit the network packet via NIC 124. This process is repeated until all of data 341 have been assembled into packets and transmitted.

FIG. 3D illustrates the memory regions of system memory 122 when the memory being dumped, depicted as data 342, lies within the 4 GB memory region. In this situation, core dump handler 331 assembles portions of data 342 into a network packet, including the IP address of network dump server 150, the MAC address of NIC 124 that is to be used, and the IP address for the NIC in the header of the network packet, without copying into buffer 350. After assembly of the network packet by core dump handler 331, DINI module 332 takes over control and invokes PXELINUX to transmit the network packet via NIC 124. This process is repeated until all of data 342 have been assembled into packets and transmitted.

Figure 4:
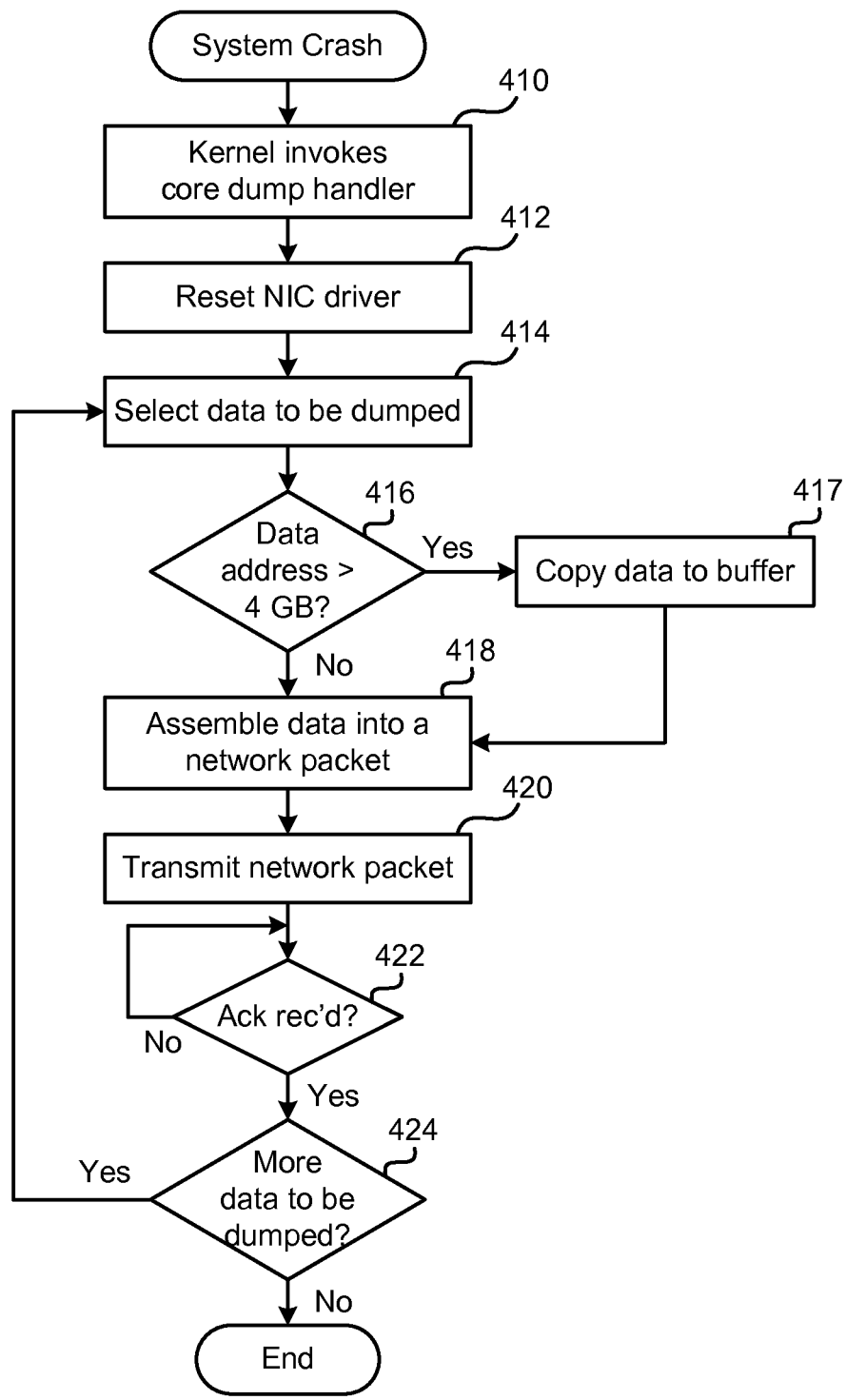
FIG. 4 is a flow diagram that illustrates the steps of a method for handling a system crash according to one or more embodiments of the present invention.

FIG. 4 is a flow diagram that illustrates the steps of a method for handling a system crash according to one or more embodiments of the present invention. This method is carried out by CPU 121 of computer system 100 according to instructions stored in system memory 122 as part of system software 110 including kernel 111 and core dump handler 331, UNDI APIs, PXELINUX, and DINI module 332.

The method begins at step 410, where kernel 111 invokes core dump handler 331 upon detection of system crash. At step 412, core dump handler 331 resets NIC 124 to bring it to a known state. Because there is no single universal reset method that works for all network devices, each of the following methods are attempted: (1) function level reset; (2) D3hot and D0 transition; (3) PCIe link reset; and (4) PCI secondary bus reset, until reset is achieved. In one embodiment, one or more of these methods are not even attempted if it is already known that the method will not work.

At step 414, kernel 111 selects the data to be dumped over the network. The location of this data may be above the 4 GB boundary as shown in FIG. 3E or within the 4 GB region as shown in FIG. 3F. Kernel 111 performs this check at step 416. If the location of the data to be dumped is above the 4 GB boundary, kernel 111 copies this data to buffer 350 (step 417). Then, control is switched over to core dump handler 331 which assembles the data into a network packet at step 418. On the other hand, if the location of the data to be dumped is within the 4 GB region, step 418 is carried out without executing step 417. After assembly of the network packet by core dump handler 331, DINI module 332 takes over control at step 420 and invokes PXELINUX to transmit the network packet via NIC 124. At step 422, DINI module 332 waits for acknowledgement of the receipt of the network packet by network dump server 150. Upon receipt of the acknowledgement, control is switched over to kernel 111, which checks at step 424 to see if additional data need to be dumped. If there are additional data to be dumped, step 414 through 424 are repeated. If not, the method terminates.

In alternative embodiments of the present invention, the network data dump process described in conjunction with FIG. 4 may be associated with an event other than a system crash. For example, computer system 100 may be programmed to transmit logs to a central server using the network data dump process. When this feature is implemented in multiple computer systems being managed by an administrator, the administrator can inspect the logs of all the computer systems without having to log into each one.

It should be recognized that embodiments of the present invention may employ network bootstrap programs other than PXELINUX. In an alternative embodiment, gPXE is used as the network bootstrap program.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of transferring diagnostic data for a computing device over a network using a network device, comprising:
   prior to loading of system software for the computing device into a system memory, loading application programming interfaces (APIs) for the network device into a protected memory region of the system memory, wherein the protected memory region is a region within the system memory that is not accessible by the system software;
   preserving the loaded APIs in the protected memory region after booting of the system software and after execution control of the computing device has been transferred to the system software; and
   after booting of the system software and after the execution control of the computing device has been transferred to the system software, invoking at least one of the loaded APIs that has been preserved in the protected memory region to transfer the diagnostic data over the network using the network device.

2. The method of claim 1, further comprising:
   receiving a network bootstrap program using the loaded APIs through the network device;
   storing the network bootstrap program in the protected memory region;
   retrieving the system software from a network boot server using the network bootstrap program;
   loading the system software into another memory region of the system memory; and
   transferring execution control of the computing device to the system software.

3. The method of claim 1, further comprising:
   determining that a condition for transferring the diagnostic data over the network is met; and
   copying one or more portions of the diagnostic data from a first system memory region that is not accessible by the network bootstrap program to a second system memory region that is accessible by the network bootstrap program,
   wherein the one or more loaded APIs are invoked by the network bootstrap program to transfer the diagnostic data stored in the second system memory region over the network.

4. The method of claim 3, wherein the condition for transferring the diagnostic data over the network is an error in the system software.

5. The method of claim 1, further comprising:
   determining an error condition in the system software; and
   resetting the network device,
   wherein the one or more loaded APIs are invoked by the network bootstrap program to transfer the diagnostic data stored in the second system memory region over the network.

6. The method of claim 5, further comprising:
   assembling the diagnostic data into a plurality of network packets.

7. The method of claim 1, wherein the contents of the protected memory region are preserved by excluding mappings to the protected memory region in page tables maintained by the system software, and disallowing direct memory accesses into the protected memory region.

8. The method of claim 1, wherein the system software includes a kernel of an operating system.

9. The method of claim 1, wherein the system software includes a kernel of a hypervisor.

10. A non-transitory computer readable storage medium comprising instructions for causing a computer device to carry out a method that includes the steps of:
    prior to loading of system software for the computing device into a system memory, loading application programming interfaces (APIs) for the network device into a protected memory region of the system memory, wherein the protected memory region is a region within the system memory that is not accessible by the system software;
    preserving the loaded APIs in the protected memory region after booting of the system software and after execution control of the computing device has been transferred to the system software; and
    after booting of the system software and after the execution control of the computing device has been transferred to the system software, invoking one or more of the loaded APIs that have been preserved in the protected memory region to transfer the diagnostic data over the network using the network device.

11. The non-transitory computer readable storage medium of claim 10, wherein the method further includes the steps of:
    receiving a network bootstrap program using the loaded APIs through the network device;
    storing the network bootstrap program in the protected memory region;
    retrieving the system software from a network boot server using the network bootstrap program;
    loading the system software into another memory region of the system memory; and
    transferring execution control of the computing device to the system software.

12. The non-transitory computer readable storage medium of claim 10, wherein the method further includes the steps of:
    determining that a condition for transferring the diagnostic data over the network is met; and
    copying one or more portions of the diagnostic data from a first system memory region that is not accessible by the network bootstrap program to a second system memory region that is accessible by the network bootstrap program, wherein the one or more loaded APIs are invoked by the network bootstrap program to transfer the diagnostic data stored in the second system memory region over the network.

13. The non-transitory computer readable storage medium of claim 12, wherein the condition for transferring the diagnostic data over the network is an error in the system software.

14. The non-transitory computer readable storage medium of claim 10, wherein the method further includes the steps of:
determining an error condition in the system software; and
resetting the network device,
wherein the one or more loaded APIs are invoked by the network bootstrap program to transfer the diagnostic data stored in the second system memory region over the network.

15. The non-transitory computer readable storage medium of claim 10, wherein the contents of the protected memory region are preserved by excluding mappings to the protected memory region in page tables maintained by the system software, and disallowing direct memory accesses into the protected memory region.

16. The non-transitory computer readable storage medium of claim 10, wherein the system software includes a kernel of an operating system.

17. The non-transitory computer readable storage medium of claim 10, wherein the system software includes a kernel of a hypervisor.

18. A computing device having one or more applications being executed therein on top of system software for the computing device, the computing device comprising:
a network device having firmware stored therein;
a system memory having stored therein a copy of the firmware of the network device and a copy of a network bootstrap program that includes application programming interfaces that call into the firmware of the network device; and
a processing unit under control of the system software that is executing instructions from the one or more applications,
wherein the processing unit is programmed to execute instructions that cause the copy of the firmware and the copy of the network bootstrap program to be stored in a protected region of the system memory prior to loading the system software, and preserved in the protected region of the system memory after control has been transferred to the system software,
wherein the protected region of the system memory is not accessible by the system software.

19. The computing device of claim 18, wherein the network bootstrap program includes instructions for carrying out a network boot according to a PXE standard.

20. The computing device of claim 19, wherein the firmware of the network device includes universal network device interface application programming interfaces.

21. The computing device of claim 18, wherein the memory region of the system memory in which the copy of the firmware of the network device and the network bootstrap program are stored, is addressable by the processing mode operating in a real mode.

22. The computing device of claim 21, wherein the processing unit is programmed to execute instructions that cause memory mappings to said protected memory region and direct memory accesses into said protected memory region to be prohibited.

23. The computing device of claim 18, wherein the processing unit is programmed to execute instructions that cause a network dump to be carried out using the copy of the firmware of the network device and the network bootstrap program when the system software abnormally terminates.

24. The computing device of claim 18, wherein the system software is an operating system.

25. The computing device of claim 18, wherein the system software is a hypervisor and the one or more applications are virtual machines.

* * * * *